(12) United States Patent
Hettich

(10) Patent No.: US 6,328,516 B1
(45) Date of Patent: Dec. 11, 2001

(54) SCREW WITH CUTTING EDGE

(75) Inventor: Ulrich Hettich, Schramberg (DE)

(73) Assignee: Ludwig Hettich & Co., Schramberg-Sulgen (DE)

(*) Notice: Subject to any disclaimer, the term of this patent is extended or adjusted under 35 U.S.C. 154(b) by 0 days.

(21) Appl. No.: 09/536,612

(22) Filed: Mar. 28, 2000

(51) Int. Cl.[7] .................................................. F16B 25/10
(52) U.S. Cl. ................................. 411/387.2; 411/387.1; 411/311; 411/413
(58) Field of Search ................. 411/386, 387.1–387.8, 411/413, 311

(56) References Cited

U.S. PATENT DOCUMENTS

| | | | |
|---|---|---|---|
| 1,084,643 | * | 1/1914 | Lasater . |
| 4,323,326 | * | 4/1982 | Okada . |
| 4,878,793 | * | 11/1989 | Hewison . |
| 5,273,383 | * | 12/1993 | Hughes . |
| 5,895,187 | * | 4/1999 | Kuo-Tai . |
| 6,000,892 | * | 12/1999 | Takasaki . |

* cited by examiner

Primary Examiner—Flemming Saether
(74) Attorney, Agent, or Firm—Carter, Ledyard & Milburn

(57) ABSTRACT

A screw has a shank portion (20) provided with a thread (21) and passing over via a transition into a conical tip (22). One or more parallel fins (24) are provided at least in the area of the tip. They are formed with cutting edges (23) and preferably disposed at an angle of inclination (13) of no less than 5° with respect to the longitudinal axis of the screw. The fins (24) project beyond the core diameter (1) of the shank portion (20). The conical tip (22) includes a finless end portion (26). The thread (21), however, extends across the full length of the tip (22).

15 Claims, 3 Drawing Sheets

SCREW WITH CUTTING EDGE

FIELD OF THE INVENTION

The invention relates to a screw comprising a shank portion, a thread, a conical tip, and at least one cutting edge to facilitate penetration of the screw into a workpiece upon being turned.

BACKGROUND OF THE INVENTION

In a known screw of this kind (JP 5-196 021 A)cutting fins as well as threads are provided in common in the tip area up to the free end of the screw.

In another known screw the cutting edge is formed at a so-called cutting channel, i.e. a notch which continues across the tip area and into the shank of the screw (DE 295 13 571 U1).

Further known is a screw which comprises an abrasive edge zone embodied by a plurality of fins in the region of the screw tip where there is no thread, the fins being oriented in the direction of the longitudinal axis of the screw (DE 195 25 732 A1).

Normal wood screws, especially when being turned to enter into softwood, such as coniferous wood, produce a splitting effect. That is true particularly of screws which have a great diameter. The screws penetrating the wood compact the wood fibers transversely of the direction of the fibers at two diametrically opposed locations of the screw so that frequently the wood suffers cleavage. Thus the cohesion of the wood is deteriorated and, therefore, the retaining force of the screw is diminished.

SUMMARY OF THE INVENTION

It is an object of the instant invention to provide a screw as described above which is capable to reduce the cleaving effect of the screw when screwed into a workpiece, especially a wooden workpiece.

It is a further object to provide a screw which provides an increased retaining force when screwed into a workpiece, especially a wooden workpiece.

The present invention serves to meet these and other objects.

Preferred embodiments of the invention are recited in the subclaims.

With the invention, the cutting edges provided in the tip area at the fins projecting beyond the core diameter penetrate into the wood at locations equally distributed around the periphery of the screw tip of the compacted fibers, cutting into the fibers and thereby counteracting the tendency of cleaving the wooden workpiece into which the screw is threaded. The splitting forces of the wood which might result in a loss of retention of the screw are reduced by the cuts being made.

The thread in the finless terminal portion of the tip of the screw makes sure the screw is drawn into the workpiece firmly at the onset when it is threaded especially into wooden material. This is not impeded by the cutting edges as they do not begin to become effective before a certain minimum depth of penetration into the wooden workpiece has been reached.

Although theoretically the angle of inclination of the fins with respect to the longitudinal axis of the screw, ultimately, may reach zero value, the fins with their cutting edges preferably are disposed at an angle of inclination greater than 5φ in terms of amount with respect to the longitudinal axis of the screw. The best cutting effect is obtained if the fins have a left-hand twist, in other words if they become effective over the full length of the cutting edges as they are being screwed in. The length of the fins may end at the transition between the shank and the tip. Yet it may also extend farther beyond and over part of the shank. In either event the height of the fin surpasses the core diameter of the screw so that the diameter as measured across the fins at the transition between the tip and the shank portion always is greater than the core diameter of the shank portion.

Advantageously, fins with cutting edges according to the invention may be provided also in the area where the thread terminates towards a threadless shank portion or towards the head of a screw.

With the screw according to the invention the thread pitch is greater than it is with conventional wood screws. The pitch angle of the thread preferably lies in the range between 16° and 20°, especially at about 19°.

The screw according to the invention can be threaded without any advance boring into wood, especially softwood but also into other material, such as chip boards.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
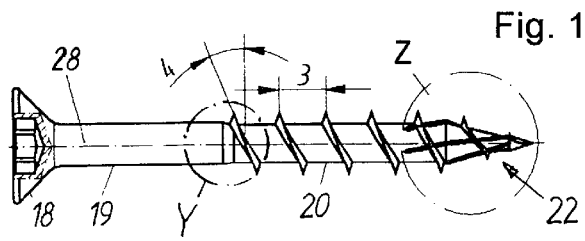
FIG. 1 shows a first embodiment of a wood screw according to the invention.

For the sake of simplicity, like members or members having like functions are marked by the same reference numerals.

The screw depicted in FIG. 1 comprises a flathead 18, a shank having a threadless shank portion 19 and a shank portion 20 provided with a thread 21, as well as a tip 22. The thread 21 on the shank portion 20 has a pitch angle 4 which may be between 16° and 20°. In the embodiment illustrated the pitch angle is approximately 19°. This pitch angle is greater than in the case of conventional wood screws where it is from 14° to 15°.

The thread pitch 3 increases proportionally with the thread diameter. In practice it is, for example 2.4 mm at a thread diameter of 3 mm, while it is 8 mm at a thread diameter of 10 mm.

Four parallel fins 24 extend over part 9 of the length 7 of the tip 22 of the screw. They are evenly distributed around the periphery and inclined at an angle of inclination 13 with respect to the longitudinal axis 28 of the screw. The angle of inclination 13 which should be no smaller than 5° actually is 10° in the embodiment shown. In practice, the values may reach up to 20°, preferably being about 15°. Preferably it is inclined towards the screw-in direction (having a left-hand twist).

The tip 22 has a conical end portion 26 at the foot 27 of which the fins 24 terminate. The end portion 26 thus is free of fins 24 in all the embodiments illustrated, yet it does have a thread 21. The length 8 of the conical end portion 26 approximately equals one third of the length 7 of the tip. The tip angle 5 of the finless end portion 26 preferably is about 35°, while the tip angle 6 of the frustoconical portion between the foot 27 and the transition 25 towards the shank portion 22 is approximately 24°.

Figure 2:
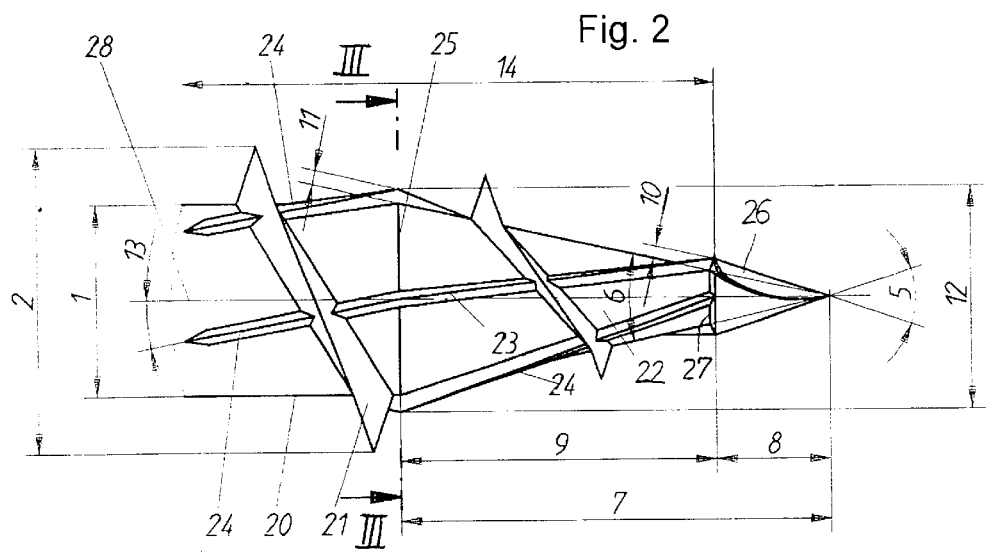
FIG. 2 shows a cutout marked Z in FIG. 1, on an enlarged scale.
Figure 3:
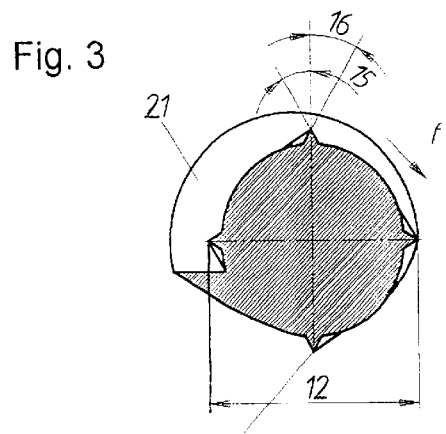
FIG. 3 is a sectional elecation along line III—III in FIG. 2.
Figure 4:
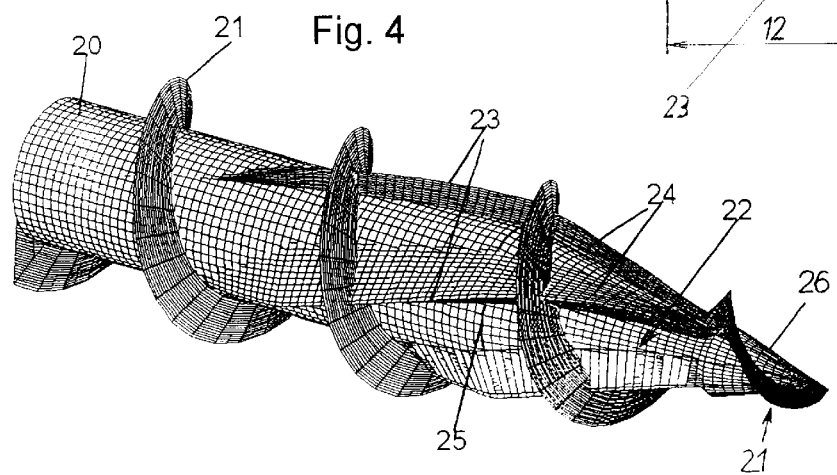
FIG. 4 is an illustration of the tip area of a screw according to the invention.

Each fin 24 has a cutting edge 23 at its crest. As may be seen best in FIG. 3, the fin, preferably, is designed to be asymmetric, i.e. it has flank angles 15, 16 of different dimensions. Here it is preferred for the steeper flank to face the screw-in direction (cf. arrow of screw-in turning f in FIG. 3). FIG. 2 demonstrates that the maximum fin diameter 12 at the transition 25 between the tip 22 and the shank portion 22 is greater than the core diameter 1 of the screw, but smaller than the outer thread diameter 2 (cf. FIGS. 2 and 5).

With the screw according to FIG. 1 the fin length 14 equals the sum of the length 9 and 2× the pitch 3 of the thread.

The tip angle 6 of the tip 22 is 24° in the embodiment shown.

Figure 5:
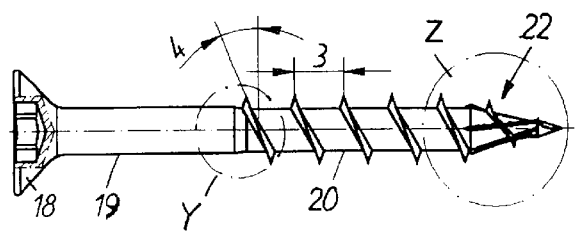
FIG. 5 shows a second embodiment of a wood screw according to the invention.
Figure 6:
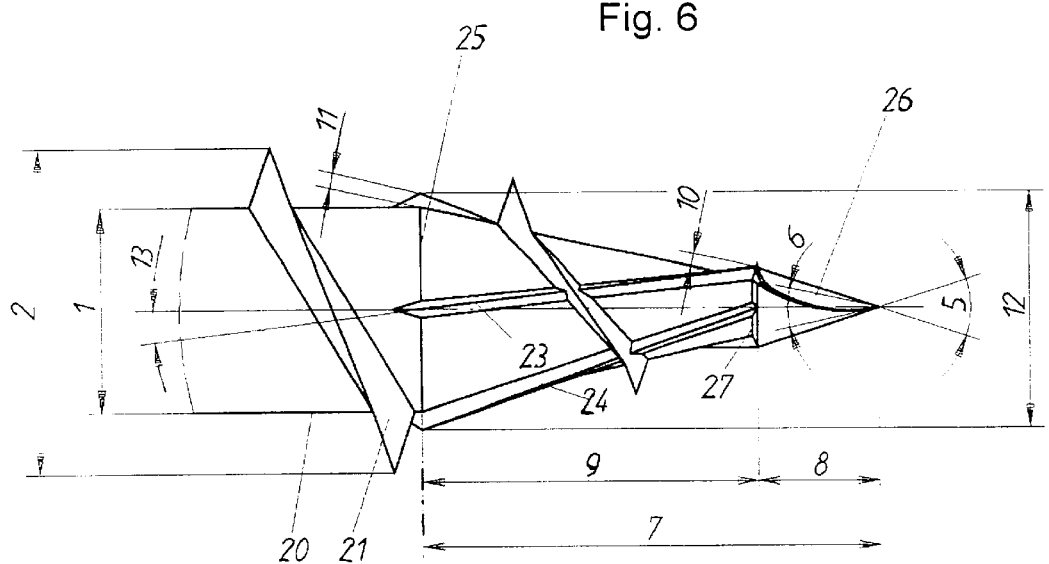
FIG. 6 shows a detail of the screw, marked Z in FIG. 5, on an enlarged scale.
Figure 7:
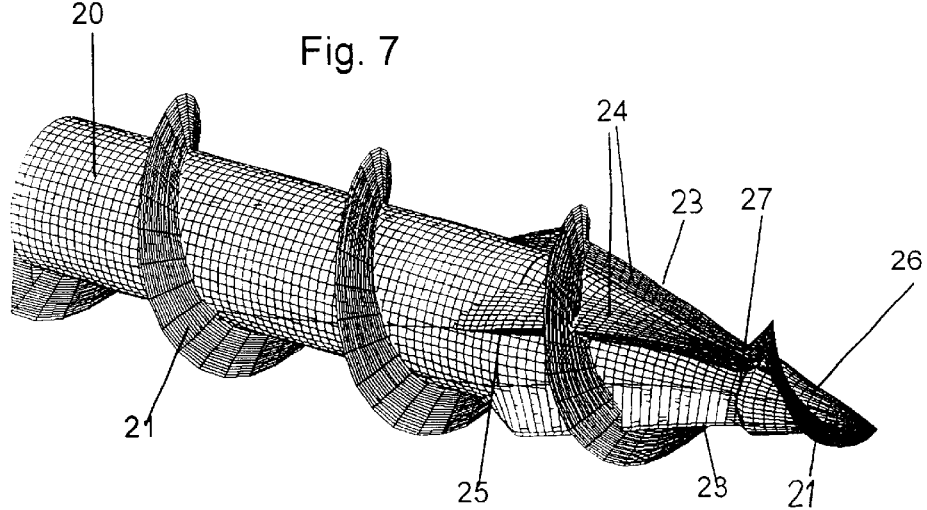
FIG. 7 is an illustration of the tip area of the screw according to FIGS. 5 and 6.
Figure 8:
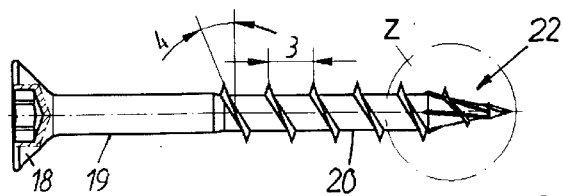
FIG. 8 shows a third embodiment of a screw according to the invention.
Figure 9:
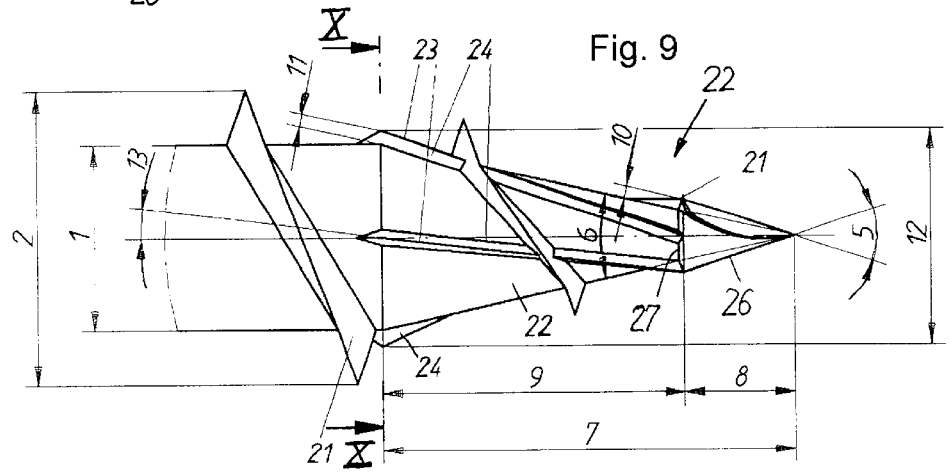
FIG. 9 shows a detail marked Z in FIG. 8, on an enlarged scale.
Figure 11:
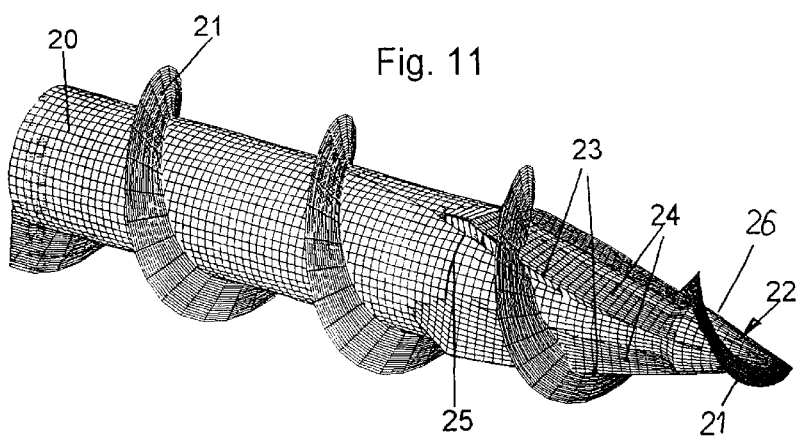
FIG. 11 is an illustration of the tip area of the screw according to FIGS. 8 to 10.
Figure 10:
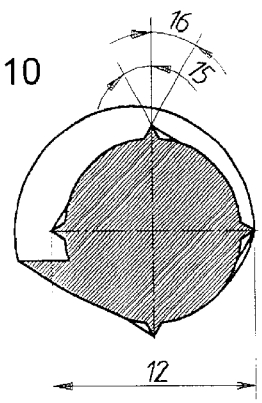
FIG. 10 is sectional elevation along line X—X in FIG. 9.

The screw according to the second embodiment shown in FIGS. 5 to 7 differs from the one shown in FIGS. 1 to 4 in that the fins 24 with the cutting edges 23 terminate at the transition 25 between the shank portion 20 and the tip 22.

The fin length 9 of this embodiment preferably corresponds to about two thirds of the tip length 7.

In other respects the screw shown in FIGS. 5 to 7 corresponds to the one presented in FIGS. 1 to 4 and, therefore, will not be described further.

In both embodiments according to FIGS. 1 to 4 and 5 to 7 the fins 24 with the cutting edges 23 have a left-hand twist, i.e. they are inclined towards the screw-in direction. As a consequence, the cutting edges 23 become active simultaneously over the full length as the screw is screwed in. In this manner optimum cutting effect is obtained.

A reduction of the cleaving effect is achieved also if the fins 24 have a right-hand twist. Such an embodiment is illustrated in FIGS. 8 to 11. The angle of inclination 13 of the fins 24 with respect to the longitudinal axis 10 of the screw in this case is −10°.

As with the embodiment according to FIGS. 5 to 7, the fins 24 terminate at the transition 25 between the tip 22 and the shank portion 20 .

In other respects the screw according to FIGS. 8 to 11 corresponds to that shown in FIGS. 5 to 7 so that a more detailed description may be dispensed with.

Figure 12:
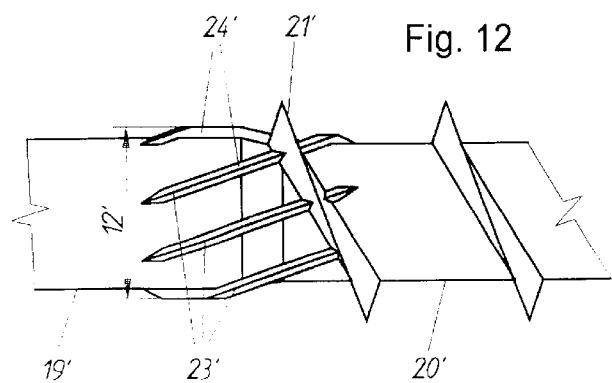
FIG. 12 shows a variant at Y, on an enlarged scale, optionally to be provided to advantage in the wood screw as shown in FIG. 1 or 5.

FIG. 12 shows yet another embodiment of the invention. The design (not shown) of the tip area of this wood screw is similar to that of FIGS. 1 to 4. However, as with the embodiment according to FIGS. 5 to 7, the fins 24 terminate at the transition 25 between the tip 22' and the shank portion 20'. A cross section taken at this transition is identical with the one shown in FIG. 3. Reference is made to the description of FIGS. 1 to 7, especially FIGS. 2, 3, and 6 in order to avoid unnecessary repetitions.

The wood screw according to FIG. 12 differs from the other embodiments described above in that it comprises a group of fins 24' also in the terminal region of the thread at the transition between the shank portion 20' and the thread-less smooth shank portion 19' towards the head. The fins 24' likewise have a cutting edge 23' at their crest and are inclined with respect to the longitudinal axis 28 by the same angle of inclination 13 as the fins 24 in the tip area, e.g. at an angle of inclination 13 of 10° with respect to the longitudinal axis 28 of the screw.

The cross section of fins 24', in principle, is the same as that of fins 24. However, the maximum fin diameter is greater than the diameter of the smooth shank portion 19' so that also the fins 24' may exercise their cutting action. For manufacturing reasons the diameter of the smooth shank portion 19' is greater than the diameter of the shank portion 20' having the thread 21' obtained by rolling and, therefore, also the maximum fin diameter is greater than the maximum fin diameter 12 of the fins 24 in the tip are a (not shown).

The additional fins 24' at the termination zone of the thread function to prevent any hindrance due to friction between the smooth shank portion 19' and the wall of the borehole in the wood as the screw is turned into the wood.

The features disclosed in the specification above, in the drawings and claims may be essential for implementing the invention, both individually and in any combination.

What is claimed is:

1. A screw comprising a shank portion (20), a thread (21), a conical tip (22), and at least one cutting edge (23), wherein
    (a) the thread (21) extends at least over part of the length of the shank portion and over the entire length of the tip (22) of the screw,
    (b) one or more fins (24) project beyond the core diameter (1) of the shank portion (20), the leading edge of each of said one or more fins being circumferentially spaced from the trailing edge of the adjacent one of said one or more fins;
    (c) the cutting edge (23) is formed on said at least one or more fins (24),
    (d) said at least one or more fins (24) defining a smaller angle of inclination (13) than the thread (21) with the longitudinal axis of the screw, and
    (e) the cutting edge (23) of said at least one or more fins extending over part of the conical tip (22) up to a finless end portion (26) of the said conical tip (22).

2. The screw as claimed in claim 1, wherein the angle of inclination (13) of each fin (24) with respect to the longitudinal axis (10) of the screw is greater than 5°.

3. The screw as claimed in claim 2, wherein the angle of inclination (13) of each fin (24) with respect to the longitudinal axis (10) of the screw being approximately 15°.

4. The screw as claimed in claim 1, wherein each fin (24) ends at the (25) between the shank portion (20) and the tip (22).

5. The screw as claimed in claim 1, wherein each fin (24) extends into the shank portion (20), passing beyond the transition (25) between the shank portion (20) and the tip (22).

6. The screw as claimed in claim 1, wherein said at least one fin (24) has a left-hand twist.

7. The screw as claimed in claim 1, including between two and eight fins (24) evenly distributed around the circumference of said shank portion.

8. The screw as claimed in claim 1, wherein each fin (24) is asymmetrical in cross section, and the fin flank is oriented with the steeper flank angle (15) in the screw-in direction.

9. The screw as claimed in claim 1, wherein the pitch angle (4) of the thread (21) is between 16° and 20°.

10. The screw of claim 9 wherein said pitch angle is approximately 19°.

11. The screw as claimed in claim 1, including at least one additional fin (24') with a cutting edge (23') extending from the termination of the thread towards a threadless shank portion (19).

12. The screw as claimed in claim 11, wherein said additional fin (24')the same configuration and angle of inclination (13) as the fin (24) in the tip area.

13. The screw as claimed in claim 11, wherein the diameter (12') of the additional fin (24') is greater that the diameter (12) of the fin (24) in the tip area.

14. The screw as claimed in claim 1 wherein the cutting edge (23) of each fin (24) has a greater slope than the other edge of said fin (24).

15. A screw comprising a shank portion (20), a thread (21), a conical tip (22), and at least one cutting edge (23), wherein (a) the thread (21) extends at least over part of the length of the shank portion and over the entire length of the tip (22) of the screw, (b) one or more fins (24) project beyond the core diameter (1) of the shank portion (20), (c) the cutting edge (23) is formed on said at least one or more fins (24) with the slope of the leading edge thereof being greater than the slope of the trailing edge thereof, (d) said at least one or more fins (24) defining a smaller angle of inclination (13) than the thread (21) with the longitudinal axis of the screw, and (e) the cutting edge (23) of said at least one or more fins extending over part of the conical tip (22) up to a finless end portion (26) of the said conical tip.

* * * * *